US009325928B2

(12) United States Patent
Moon

(10) Patent No.: US 9,325,928 B2
(45) Date of Patent: Apr. 26, 2016

(54) APPARATUS AND METHOD FOR RECEIVING BROADCAST

(71) Applicant: SAMSUNG ELECTRONICS CO., LTD., Suwon-si (KR)

(72) Inventor: Sang-yeon Moon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 13/750,595

(22) Filed: Jan. 25, 2013

(65) Prior Publication Data

US 2013/0198779 A1    Aug. 1, 2013

(30) Foreign Application Priority Data

Jan. 27, 2012    (KR) .................. 10-2012-0008302

(51) Int. Cl.
| | | |
|---|---|---|
| H04N 5/445 | (2011.01) | |
| H04N 5/50 | (2006.01) | |
| H04N 21/434 | (2011.01) | |
| H04N 21/438 | (2011.01) | |
| H04N 21/435 | (2011.01) | |
| H04N 21/443 | (2011.01) | |

(52) U.S. Cl.
CPC ............. *H04N 5/50* (2013.01); *H04N 21/435* (2013.01); *H04N 21/4342* (2013.01); *H04N 21/4345* (2013.01); *H04N 21/4382* (2013.01); *H04N 21/4383* (2013.01); *H04N 21/4384* (2013.01); *H04N 21/4432* (2013.01)

(58) Field of Classification Search
CPC . H04N 5/44543; H04N 21/482; H04N 7/173; H04N 7/17309; H04N 7/17318; H04N 21/235; H04N 21/435; H04N 5/4401
USPC ............ 725/39, 131, 132, 139, 140; 348/725, 348/726, 729, 731, 732, 553
See application file for complete search history.

(56) References Cited

U.S. PATENT DOCUMENTS

| | | | | | |
|---|---|---|---|---|---|
| 5,584,051 | A | * | 12/1996 | Goken | ................... H04H 20/22 340/7.43 |
| 6,160,570 | A | * | 12/2000 | Sitnik | ............................... 725/9 |
| 7,266,341 | B2 | * | 9/2007 | Nakamura | ................... 455/3.01 |
| 7,269,836 | B2 | * | 9/2007 | Nogima | ............. H04N 21/2181 348/E5.008 |
| 7,600,247 | B2 | * | 10/2009 | Onomatsu | ....................... 725/72 |

(Continued)

FOREIGN PATENT DOCUMENTS

| | | |
|---|---|---|
| EP | 2076034 A1 | 7/2009 |
| EP | 2244457 A1 | 10/2010 |

OTHER PUBLICATIONS

Communication issued on Dec. 17, 2014 by the European Patent Office in related application No. 13152285.6.

Primary Examiner — Annan Shang
(74) Attorney, Agent, or Firm — Sughrue Mion, PLLC

(57) ABSTRACT

An apparatus and a method for receiving a broadcast. The broadcast receiving apparatus includes a tuner unit which performs channel scanning, a tuner parameter generation unit which generates tuner parameter information which includes channel information of channels scanned by the tuner unit and a channel setting value to tune to a channel corresponding to the channel information, a storage unit which stores the tuner parameter information, an input unit which receives input of a channel change request, and a control unit which, if the channel change request is input, controls the tuner unit to tune to a requested channel using the tuner parameter information stored in the storage unit.

22 Claims, 4 Drawing Sheets

(56) References Cited

U.S. PATENT DOCUMENTS

| | | | |
|---|---|---|---|
| 7,602,448 B2* | 10/2009 | Hutchinson et al. | 348/725 |
| 8,015,580 B2* | 9/2011 | Poling et al. | 725/39 |
| 8,442,248 B2* | 5/2013 | Solum | 381/315 |
| 8,613,010 B2* | 12/2013 | Lim | 725/31 |
| 8,620,988 B2* | 12/2013 | Sohm | G06Q 10/10 370/241 |
| 2003/0026364 A1 | 2/2003 | Adachi | |
| 2004/0117855 A1 | 6/2004 | Nakamura | |
| 2006/0055831 A1 | 3/2006 | Onomatsu | |
| 2007/0060085 A1 | 3/2007 | Choi | |
| 2009/0007180 A1 | 1/2009 | Choi | |
| 2009/0282439 A1* | 11/2009 | Irwin | H04N 5/44543 725/50 |
| 2009/0313674 A1 | 12/2009 | Ludvig et al. | |
| 2010/0060786 A1 | 3/2010 | Kim et al. | |
| 2012/0254916 A1* | 10/2012 | Sakashita et al. | 725/39 |
| 2012/0324510 A1* | 12/2012 | Leley | H04N 21/4333 725/50 |

* cited by examiner

APPARATUS AND METHOD FOR RECEIVING BROADCAST

CROSS-REFERENCE TO RELATED APPLICATION

This application claims priority from Korean Patent Application No. 10-2012-0008302, filed on Jan. 27, 2012 in the Korean Intellectual Property Office, the disclosure of which is incorporated herein in its entirety by reference.

BACKGROUND

1. Field

Apparatuses and methods consistent with exemplary embodiments relate to an apparatus and a method for receiving a broadcast, and more particularly, to an apparatus and a method for receiving a broadcast, which can improve a channel change speed.

2. Description of the Related Art

If a channel change request is input to a broadcast receiving apparatus such as a set-top box by a user, the broadcast receiving apparatus obtains a frequency on a broadcast signal, which is received through a radio frequency (RF) network, through a tuner in order to tune to a channel corresponding to the input channel change request, demodulates the obtained broadcast signal, and decodes the demodulated signal, thereby changing a channel.

Specifically, in order to tune to a channel corresponding to a channel change request of a user, the broadcast receiving apparatus should calculate a channel setting value such as frequency information, offset information, and auto gain control (AGC) information of the corresponding channel. If the channel is tuned using the channel setting value and an intermediate frequency signal of the channel is received, the broadcast receiving apparatus should calculate a demodulation setting value such as frequency modulation information, forward error correction (FEC) type information, and AGC information in order to demodulate the intermediate frequency signal. If the demodulation setting value is calculated and the intermediate frequency signal of the tuned channel is demodulated, the broadcast receiving apparatus obtains audio/video packet identifier (PID) information of each broadcast program from the demodulated channel signal and decodes the demodulated channel signal.

However, such a broadcast receiving apparatus requires much time to change a channel to the channel corresponding to the channel change request input by the user by performing the above-described series of operations.

Various methods for improving a channel change speed have been suggested. For instance, a method that tunes to another channel in advance using a plurality of tuners or a method that tunes to a channel desired by a user in advance using a plurality of tuners has been suggested. However, those methods of improving a channel change speed using spare tuners have a problem that, if an expected channel is different from a channel requested by the user, the channel is changed at a speed as usual.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide an apparatus and a method for receiving a broadcast, which can improve a channel change speed.

One or more exemplary embodiments also provide an apparatus and a method for receiving a broadcast, which can improve a channel change speed using only a single tuner.

One or more exemplary embodiments provide an apparatus and a method for receiving a broadcast, which can solve a problem that may be caused by use of a plurality of tuners suggested in a related-art broadcast receiving apparatus.

According to an aspect of an exemplary embodiment, there is provided a broadcast receiving apparatus, including: a tuner unit which performs channel scanning, a tuner parameter generation unit which generates tuner parameter information which includes channel information of channels scanned by the tuner unit and a channel setting value to tune to a channel corresponding to the channel information, a storage unit which stores the tuner parameter information, an input unit which receives input of a channel change request, and a control unit which, if the channel change request is input, controls the tuner unit to tune to a requested channel using the tuner parameter information stored in the storage unit.

If an auto channel scan command is input through the input unit, the control unit may control the tuner unit to perform the channel scanning.

The tuner parameter generation unit may identify channel information of each channel scanned by the tuner unit and calculate a channel setting value regarding the identified channel information, and may generate the tuner parameter information based on the channel information and the channel setting value.

The channel information may include a channel frequency and a channel number, and the channel setting value may include at least one from among frequency offset, auto gain control (AGC) information, and inversion information.

The broadcast receiving apparatus may further include a demodulation parameter generation unit which generates demodulation parameter information including a demodulation setting value to demodulate an intermediate frequency signal received though the channels scanned by the tuner unit, and performs an operation to store the demodulation parameter information in the storage unit.

The broadcast receiving apparatus may further include a demodulation unit which, if a channel corresponding to the channel change request is tuned, demodulates an intermediate frequency signal received through the tuned channel using the demodulation parameter information stored in the storage unit, and the demodulation setting value may include at least one from among frequency modulation information, forward error correction (FEC) type information, AGC information, and inversion information.

The broadcast receiving apparatus may further include an information processing unit which obtains program specific information (PSI) from signals received through the channels scanned by the tuner unit and stores the PSI in the storage unit, and the PSI may include at least one from among program time information and audio/video packet identifier (PID) information of each broadcast program provided by each of the scanned channels.

The broadcast receiving apparatus may further include a decoding unit which, if a channel corresponding to the channel change request is tuned, decodes the demodulated intermediate frequency signal using the PSI stored in the storage unit.

The broadcast receiving apparatus may further include an electronic program guide (EPG) storage unit which stores EPG information on the scanned channels, and, if the tuner unit is in an idle state, the information processing unit may determine whether the audio/video PID information is changed or not by referring to the EPG information stored in the EPG storage unit, and may update the audio/video PID information included in the PSI.

The tuner unit may include: a first tuner unit which tunes to a channel corresponding to the channel change request, and a second tuner which performs the channel scanning, while the first tuner tunes to the channel.

The information processing unit may obtain service information (SI) from signals received from channels scanned by the second tuner unit, and may update the audio/video PID information included in the PSI of the channels stored in the storage unit.

According to an aspect of another exemplary embodiment, there is provided a method for receiving a broadcast of a broadcast receiving apparatus, the method will including: performing channel scanning, generating and storing tuner parameter information which includes channel information of the scanned channels and a channel setting value to tune to a channel corresponding to the channel information, and, if a channel change request is input, tuning to a requested channel using the stored tuner parameter information.

The performing the channel scanning may include, if an auto channel scan command is input, performing the channel scanning.

The generating and storing the tuner parameter information may include identifying channel information of each of the scanned channels, calculating a channel setting value regarding the identified channel information, and generating the tuner parameter information based on the channel information and the channel setting value.

The channel information may include at least one from among a channel frequency and a channel number, and the channel setting value may include at least one from among frequency offset, auto gain control (AGC) information, and inversion information.

The method may further include generating and storing demodulation parameter information including a demodulation setting value to demodulate an intermediate frequency signal received through the scanned channels.

The method may further include, if a channel corresponding to the channel change request is tuned, demodulating an intermediate frequency signal received through the tuned channel using the stored demodulation parameter information, and the demodulation setting value may include at least one from among frequency modulation information, forward error correction (FEC) type information, auto gain control (AGC) information, and inversion information.

The method may further include obtaining program specific information (PSI) from signals received through the scanned channels and storing the PSI, and the PSI may include at least one from among program time information and audio/video PID information of each broadcast program provided by each of the scanned channels.

The method may further include, if a channel corresponding to the channel change request is tuned, decoding the demodulated intermediate frequency signal using the stored PSI.

The method may further include, if the channel scanning is not performed, determining whether the audio/video PID information is changed or not by referring to EPG information pre-stored for the scanned channels, and updating the audio/video PID information included in the PSI.

The broadcast receiving apparatus may include a plurality of tuners, and a first tuner of the plurality of tuners may tune to one channel and receive a broadcast signal and a second tuner of the plurality of tuners may perform the channel scanning, while the first tuners tune to the one channel.

The method may further include: obtaining service information (SI) from signals received through channels scanned by the second tuner, and determining whether the audio/video PID information included in the stored PSI is changed or not by referring to the SI and updating the audio/video PID information included in the PSI.

According to an aspect of another exemplary embodiment, there is provided a broadcast receiving apparatus including: one or more tuner units which perform channel scanning; a tuner parameter generation unit which generates tuner parameter information; a storage unit which stores the tuner parameter information; and a control unit which controls the one or more tuner units to tune to a channel using the tuner parameter information stored in the storage unit.

According to an aspect of yet another exemplary embodiment, there is provided a method for receiving a broadcast of a broadcast receiving apparatus, the method including: performing channel scanning; generating and storing tuner parameter information which comprises channel information of the scanned channels and a channel setting value to tune to a channel corresponding to the channel information; and tuning to a requested channel using the stored tuner parameter information.

According to the various exemplary embodiments described above, the broadcast receiving apparatus stores the tuner parameter information, the demodulation parameter information, and the PSI on the channels, and, if a channel change request is input, performs tuning, demodulation, and decoding with respect to a corresponding channel using pre-stored tuner parameter information, demodulation parameter information, and PSI of the channel corresponding to the input channel change request, so that a channel change speed can be improved in comparison with a related-art broadcast receiving apparatus.

BRIEF DESCRIPTION OF THE DRAWING FIGURES

The above and/or other aspects will be more apparent based on detailed descriptions of exemplary embodiments, with reference to the accompanying drawings, in which.

Figure 3:
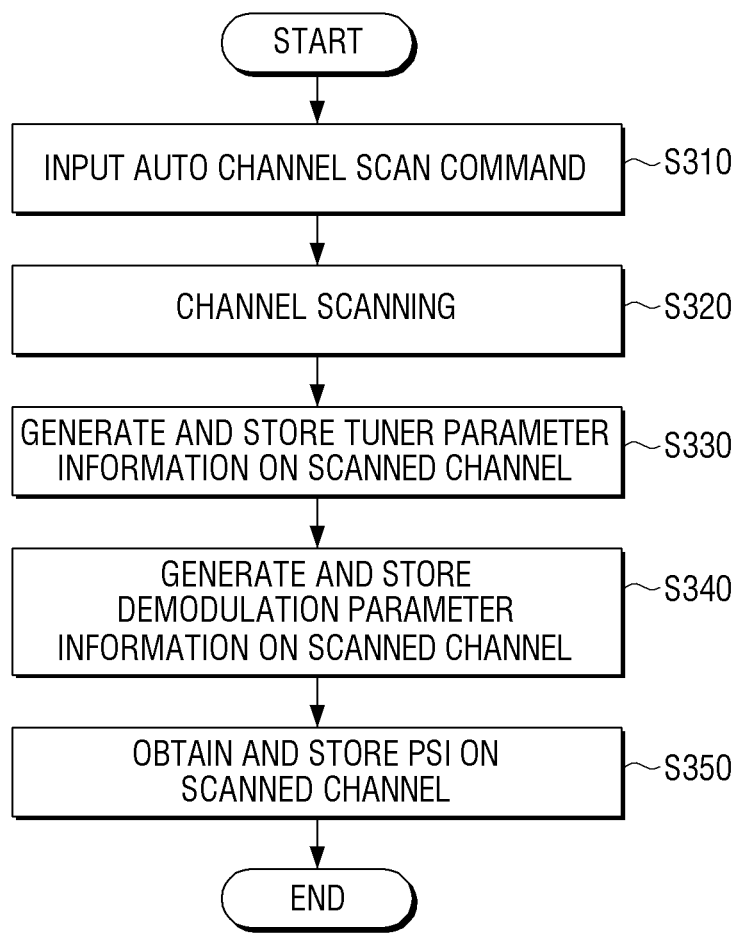
Figure 4:
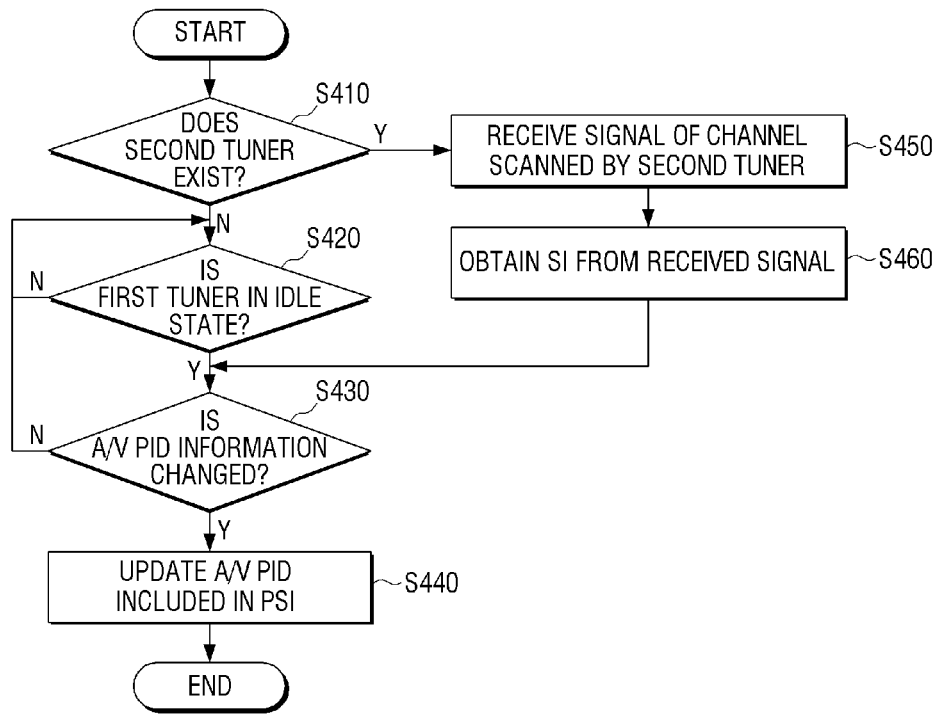

FIG. 3 is a flowchart illustrating a method for generating information which is used for change of a channel in a broadcast receiving apparatus according to an exemplary embodiment; and FIG. 4 is a flowchart illustrating a method for updating audio/video (A/V) packet identifier (PID) information included in program specific information (PSI) in a broadcast receiving apparatus according to an exemplary embodiment.

DETAILED DESCRIPTION OF EXEMPLARY EMBODIMENTS

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

Figure 1:
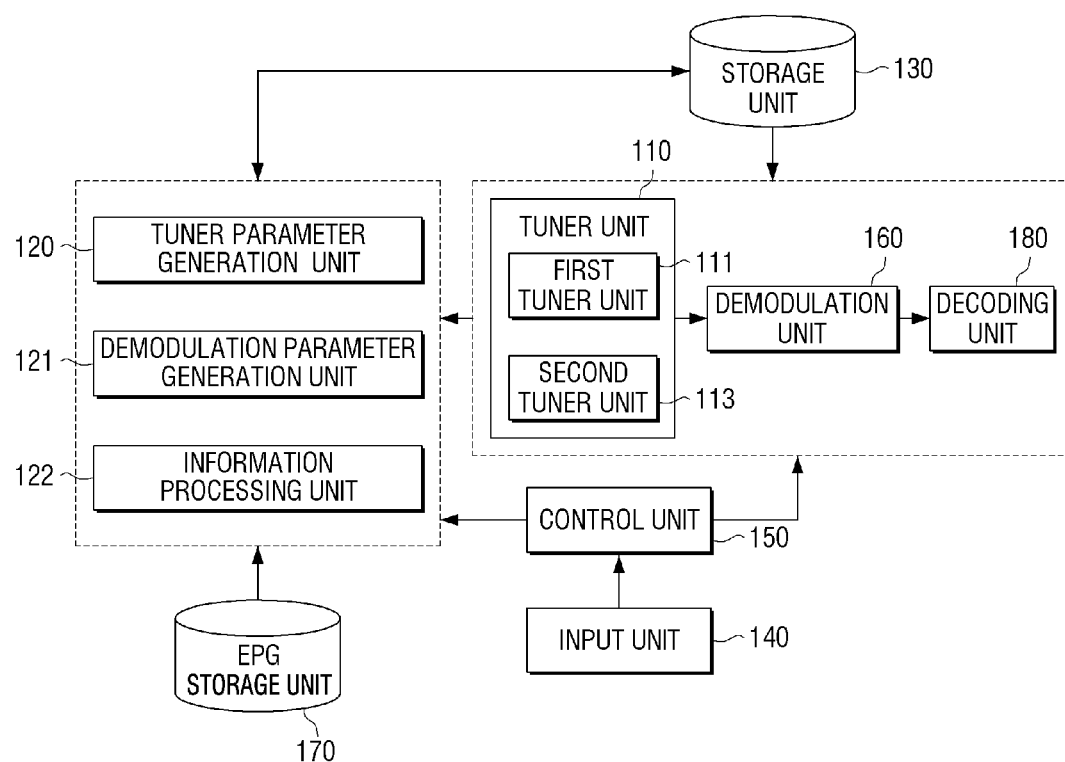
FIG. 1 is a block diagram illustrating a broadcast receiving apparatus according to an exemplary embodiment.

FIG. 1 is a block diagram illustrating a broadcast receiving apparatus according to an exemplary embodiment.

As shown in FIG. 1, the broadcast receiving apparatus includes a tuner unit 110, a tuner parameter generation unit 120, a storage unit 130, an input unit 140, and a control unit 150.

The tuner unit 110 scans a plurality of channels and tunes to a channel corresponding to a user request from among the plurality of channels. The tuner parameter generation unit 120 generates tuner parameter information that includes channel information of the channels scanned by the tuner unit 110 and a channel setting value to tune to a channel corresponding to the channel information. The storage unit 130 stores the tuner parameter information on the plurality of channels generated by the tuner parameter generation unit 120, and the input unit 140 receives channel change request information according to a channel change request of a user. If the channel change request information is input through the input unit 140 according to the channel change request of the user, the control unit 150 controls the tuner unit 110 to tune to the channel corresponding to the channel change request information based on the channel change request by the user, using the stored tuner parameter information.

Specifically, if an auto channel scan command is input through the input unit 140, the control unit 150 controls the tuner unit 110 to scan a plurality of channels. However, this should not be considered as limiting. If the broadcast receiving apparatus is initially installed, if the already installed broadcast receiving apparatus is installed in a new place, or if a physical change is detected in an input signal, the control unit 150 may control the tuner unit 110 to scan a plurality of channels.

According to such a control command of the control unit 150, the tuner unit 110 scans the plurality of channels. If the plurality of channels are scanned by the tuner unit 110, the tuner parameter generation unit 120 identifies channel information of each of the channels scanned by the tuner unit 110, and calculates a channel setting value regarding the identified channel information. The channel information recited herein may include channel frequency information and a channel number of each of the channels. According to an exemplary embodiment, if the channel scanned by the tuner unit 110 is a terrestrial broadcast channel, the tuner parameter generation unit 120 may identify channel information on a channel number of the terrestrial broadcast channel scanned by the tuner unit 110 and channel frequency information of the corresponding channel.

If the channel information is identified as described above, the tuner parameter generation unit 120 calculates a channel setting value regarding each of the channels. The channel setting value recited herein is a physical parameter value to set each of the channels scanned by the tuner unit 110, and may include at least one from among frequency offset, auto gain control (AGC) information, and inversion information. However, this should not be considered as limiting and the channel setting value may further include another physical parameter value to tune to each of the channels.

If the tuner parameter information including the channel information of each of the channels scanned by the tuner unit 110 and the channel setting value to tune to a channel corresponding to the channel information is generated as described above, the tuner parameter generation unit 120 performs an operation to store the tuner parameter information of each of the channels in the storage unit 130.

Accordingly, if a channel change request is input by the user through the input unit 140, the tuner unit 110 tunes to a channel using tuner parameter information of the channel corresponding to the input channel change request from among the tuner parameter information of the plurality of channels stored in the storage unit 130 according to a control command of the control unit 150. That is, since the tuner unit 110 according to an exemplary embodiment tunes to a channel corresponding to the channel change request input by the user using the tuner parameter information, which are pre-stored to tune to each of the plurality of channels, the broadcast receiving apparatus is not required to perform a loop operation to calculate a channel setting value to tune to a channel. Therefore, the broadcast receiving apparatus can tune to a channel more swiftly in comparison with a related-art broadcast receiving apparatus.

According to another exemplary embodiment, the broadcast receiving apparatus may further include a demodulation parameter generation unit 121 and a demodulation unit 160. The demodulation parameter generation unit 121 generates demodulation parameter information that includes a demodulation setting value to demodulate an intermediate frequency signal (IF) which is received through the channels scanned by the tuner unit 110, and performs an operation to store the demodulation parameter information in the storage unit 130. The demodulation setting value recited herein is a physical parameter value to demodulate an intermediate frequency signal received through a channel tuned by the tuner unit 110, and may include at least one from among modulation information, forward error correction (FEC) type information, auto gain control (AGC) information, and inversion information. However, this should not be considered as limiting and the demodulation setting value may further include another physical parameter value to demodulate an intermediate frequency signal received through a tuned channel.

On the other hand, if the channel corresponding to the channel change request is tuned, the demodulation unit 160 demodulates the intermediate frequency signal received through the tuned channel using the demodulation parameter information stored in the storage unit 130. Specifically, if the channel corresponding to the channel change request input by the user is tuned by the tuner unit 110 and the intermediate frequency signal of the corresponding channel is received, the demodulation unit 160 demodulates the intermediate frequency signal of the tuned channel using a demodulation setting value which is included in demodulation parameter information of the tuned channel from among the demodulation parameter information of the plurality of channels stored in the storage unit 130.

Since the demodulation unit 160 according to an exemplary embodiment demodulates the intermediate frequency signal of the tuned channel using the demodulation parameter information, which is pre-stored to demodulate the intermediate frequency signal of each of the plurality of channels as described above, the broadcast receiving apparatus is not required to perform a loop operation to calculate a demodulation setting value to demodulate an intermediate frequency signal of a tuned channel. Therefore, the broadcast receiving apparatus can change a channel more swiftly in comparison with a related-art broadcast receiving apparatus.

According to another exemplary embodiment, the broadcast receiving apparatus may further include an information processing unit 122 and a decoding unit 180. The image processing unit 122 obtains program specific information (PSI) received through each of the channels scanned by the tuner unit 110, and stores the PSI in the storage unit 130. The PSI recited herein includes broadcast program information and audio/video packet identifier (hereinafter, referred to as A/V PID) provided by each of the channels scanned by the tuner unit 110. The broadcast program information may include information on a start time and a finish time of a broadcast program. If the PSI of each of the channels scanned by the tuner unit 110 is obtained, the information processing unit 122 performs an operation to store the PSI of each of the channels in the storage unit 130.

If the channel corresponding to the channel change request is tuned, the decoding unit 180 decodes the demodulated signal of the tuned channel using the PSI stored in the storage unit 130. Specifically, if a channel change request is input by the user through the input unit 140, the decoding unit 180 obtains PSI of a channel corresponding to the input channel change request from among the PSI of the channels stored in the storage unit 130. Subsequently, if a channel signal demodulated by the demodulation unit 160 is received, the decoding unit 180 decodes the demodulated channel signal using A/V PID information corresponding to a current broadcast program by referring to broadcast program information included in the obtained PSI. Since the decoding unit 180 according to an exemplary embodiment decodes the demodulated channel signal using the A/V PID information included in the PSI for each channel stored in the storage unit 130 as described above, a time required to obtain PID information from a signal of a tuned channel and decode the signal every time a channel is changed can be minimized. Therefore, the broadcast receiving apparatus can change a channel more swiftly in comparison with a related-art broadcast receiving apparatus.

The information processing unit 122 may update the A/V PID information included in the PSI of each of the channels stored in the storage unit 130. Specifically, the broadcast receiving apparatus according to an exemplary embodiment may further include an electronic program guide (EPG) storage unit 170 that stores EPG information on the channels scanned by the tuner unit 110. Accordingly, if the tuner unit 110 does not perform a channel tuning operation, the information processing unit 122 determines whether to change the A/V PID information with reference to the EPG information stored in the EPG storage unit 170 and updates the A/V PID information included in the PSI of each of the channels stored in the storage unit 130.

Specifically, the information processing unit 122 checks whether there is changed A/V PID information from among the A/V PID information on each broadcast program of each of the channels stored in the storage unit 130, by referring to A/V PID information of each broadcast program of each of the channels included in the EPG information stored in the EPG storage unit 170. As a result of the checking, if there is changed A/V PID information from among the A/V PID information of each broadcast program of each of the channels stored in the storage unit 130, the information processing unit 122 may update the corresponding A/V PID information with the A/V PID information included in the EPG information. Since the information processing unit 122 according to an exemplary embodiment updates the A/V PID information of each broadcast program of each of the channels stored in the storage unit 130 by referring to the EPG information stored in the EPG storage unit 170 as described above, the number of times that the A/V PID information of each channel is changed can be minimized.

According to another exemplary embodiment, even if the tuner unit 110 is not in an idle state, the information processing unit 122 may update the A/V PID information included in the PSI of the channels stored in the storage unit 130 periodically. In this case, the tuner unit 110 may include a first tuner unit 111 and a second tuner unit 113. If the tuner unit 110 includes a plurality of tuners as described above, the first tuner unit 111 tunes to a channel corresponding to a channel change request input by the user through the input unit 140, whereas the second tuner unit 113 scans channels while the first tuner unit 11 tunes to the channel corresponding to the channel change request. If signals of the channels scanned by the second tuner unit 113 are received, the information processing unit 122 obtains service information (SI) from the signals of the channels. The SI recited herein refers to information that includes PSI of each of the channels. If the SI is obtained, the information processing unit 122 determines whether there is change in the A/V PID information included in the PSI of each of the channels stored in the storage unit 130 by referring to the PSI of each of the channels included in the SI, and updates the A/V PID information included in the PIS of each of the channels stored in the storage unit 130.

In the case of a broadcast program provided by each channel, the A/V PID information is uniform. However, for instance, if a broadcast program other than a regular broadcast program such as breaking news is provided, the A/V PID information of the corresponding channel may be changed. If such an event occurs, the A/V PID information included in the PSI of a specific channel stored in the storage unit 130 may be changed. Accordingly, the information processing unit 122 obtains the SI from the signals of the channels scanned by the second tuner unit 113, and updates changed A/V PID information from among the A/V PID information included in the PSI of each of the channels stored in the storage unit 130 by referring to the PSI of each of the channels included in the obtained SI.

Since the information processing unit 122 according to an exemplary embodiment updates the A/V PID information of each broadcast program of each of the channels stored in the storage unit 130 by referring to the EPG information of each of the channels or using the plurality of tuners as described, the number of times that the A/V PID information of each channel is changed can be minimized.

As described above, the storage unit 130 may store the information of at least one channel, the information relating to channel frequency, the tuner parameter information, and the demodulation parameter information generated by the tuner parameter generation unit 120, the demodulation parameter generation unit 121 and the information processing unit 122, as a single set. Accordingly, if a channel change request is input by the user, the tuner unit 110, the demodulation unit 160, and the decoding unit 180 perform tuning, demodulation, and decoding with respect to a corresponding channel using the tuner parameter information, the demodulation parameter information, which are physical parameter values corresponding to the channel change request and are stored in the storage unit 130, and the PSI, so that the broadcast receiving apparatus can improve a channel change speed in comparison with a related-art broadcast receiving apparatus.

The operations of the elements to improve the channel change speed in the broadcast receiving apparatus have been described above. Hereinafter, a method for improving a channel change speed of a broadcast receiving apparatus according to an exemplary embodiment will be explained in detail.

Figure 2:
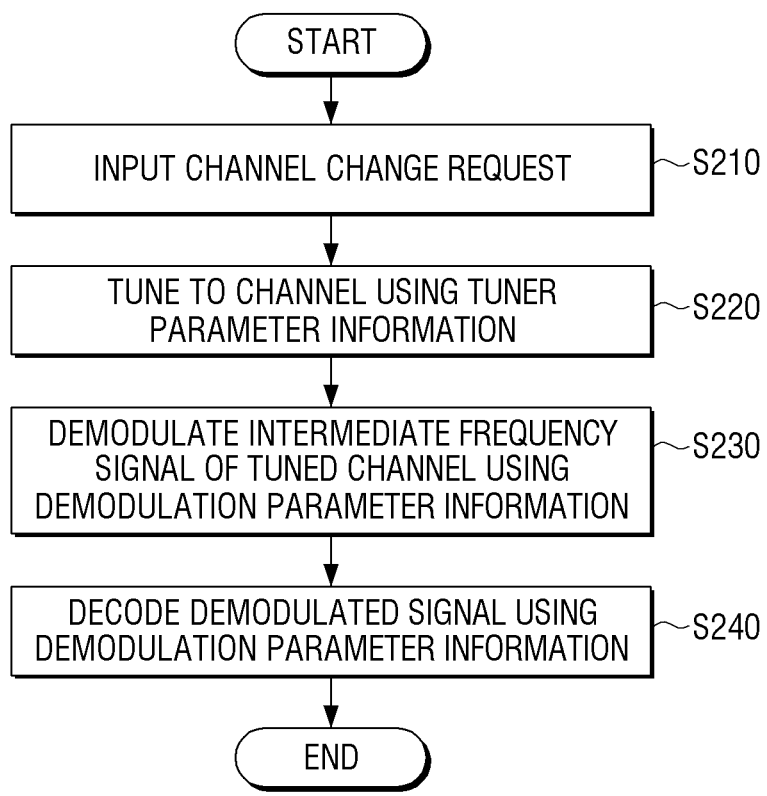
FIG. 2 is a flowchart illustrating a method for receiving a broadcast of a broadcast receiving apparatus according to an exemplary embodiment.

FIG. 2 is a flowchart illustrating a method for receiving a broadcast of a broadcast receiving apparatus according to an exemplary embodiment.

As shown in FIG. 2, if a channel change request is input by the user, the broadcast receiving apparatus tunes to a channel corresponding to the channel change request input by the user using tuner parameter information which is stored in the storage unit (S210 and S220). The tuner parameter information stored in the storage unit includes channel information of a channel to be tuned and a channel setting value to tune to the corresponding channel. The tuner parameter information including the channel information and the channel setting value is generated for every channel and is stored in the storage unit.

More specifically, the channel information included in the tuner parameter information of each of the channels includes channel frequency information and a channel number of each channel. The channel setting value included in the tuner parameter information of each of the channels is a physical parameter value used to set each channel, and includes at least one from among frequency offset, AGC information, and inversion information. However, this should not be considered as limiting and the channel setting value may further include another physical parameter value to tune to each channel. A method for generating the tuner parameter information of each of the channels will be explained in detail below.

If the channel corresponding to the channel change request input by the user is tuned using the tuner parameter information, the broadcast receiving apparatus demodulates an intermediate frequency signal (IF) which is received through the tuned channel using demodulation parameter information stored in the storage unit (S230). The demodulation parameter information includes a demodulation setting value to demodulate an intermediate frequency signal received through each of the channels, and is generated for every channel and stored in the storage unit.

More specifically, the demodulation setting value included in the demodulation parameter information of each of the channels stored in the storage unit is a physical parameter value to demodulate an intermediate frequency signal received through a tuned channel, and may include at least one from among modulation information, FEC type information, AGC information, and inversion information. However, this should not be considered as limiting and the demodulation setting value may further include another physical parameter value to demodulate an intermediate frequency signal received through a tuned channel. A method for generating the demodulation parameter information of each of the channels will be explained in detail below.

Specifically, while tuning to a channel corresponding to a channel change request input by the user, the broadcast receiving apparatus obtains demodulation parameter information on the corresponding channel from among the demodulation parameter information of each of the channels stored in the storage unit. Subsequently, if the channel corresponding to the channel change request input by the user is tuned and an intermediate frequency signal is received through the channel, the broadcast receiving apparatus demodulates the intermediate frequency signal of the channel using the obtained demodulation parameter information.

If the intermediate frequency signal of the tuned channel is demodulated using the demodulation parameter information, the broadcast receiving apparatus decodes the demodulated signal using PSI stored in the storage unit (S240). The PSI includes broadcast program information and A/V PID information provided by each of the scanned channels. The broadcast program information may include information on a start time and a finish time of a broadcast program, and the PSI including the broadcast program information and the A/V PID information is generated for every channel and is stored in the storage unit. A method for generating the demodulation parameter information of each of the channels will be explained in detail below.

Specifically, if a channel change request is input by the user, the broadcast receiving apparatus obtains PSI of a corresponding channel from the storage unit while tuning to the channel corresponding to the input channel change request. Subsequently, if a signal of the tuned channel is demodulated, the broadcast receiving apparatus decodes the demodulated signal using the obtained PSI.

As described above, the broadcast receiving apparatus according to an exemplary embodiment stores the tuner parameter information to tune to each channel, the demodulation parameter information to demodulate a signal of the tuned channel, and the PSI to decode the demodulated signal in the storage unit. Accordingly, if the channel change request is input by the user, the broadcast receiving apparatus obtains the tuner parameter information, the demodulation parameter information and the PSI of the channel corresponding to the input channel change request from the storage unit, and performs tuning, demodulation, and decoding with respect to the channel using the obtained information, so that the broadcast receiving apparatus can improve a channel change speed in comparison with a related-art broadcast receiving apparatus.

The method for changing a channel to the channel corresponding to the channel change request input by the user using the tuner parameter information, the demodulation parameter information, and the PSI, which are pre-stored in the broadcast receiving apparatus, has been described above. Hereinafter, a method for generating tuner parameter information, demodulation parameter information, and PSI, which are used to change a channel to a channel corresponding to a channel change request input by the user in the broadcast receiving apparatus, will be explained.

FIG. 3 is a flowchart illustrating a method for generating information that is used to change a channel in a broadcast receiving apparatus according to an exemplary embodiment.

As shown in FIG. 3, if a channel scan command to scan channels is input by the user, the broadcast receiving apparatus scans channels using a tuner (S310 and S320). However, this should not be considered as limiting and the broadcast receiving apparatus may scan channels if the broadcast receiving apparatus is initially installed, if the already installed broadcast receiving apparatus is installed in a new place, or if a physical change is detected in an input signal.

If the channels are scanned by the tuner, the broadcast receiving apparatus generates tuner parameter information which includes channel information of the scanned channels and a channel setting value to tune to a channel corresponding to channel information, and performs an operation to store the tuner parameter information in the storage unit (S330). Specifically, the broadcast receiving apparatus identifies channel information of each of the channels scanned by the tuner, and calculates a channel setting value regarding the identified channel information. The channel information may include channel frequency information and a channel number of each of the channels. According to an exemplary embodiment, if the channel scanned by the tuner is a terrestrial broadcast channel, the broadcast receiving apparatus may identify channel information regarding a channel number of the terrestrial broadcast channel scanned by the tuner and channel frequency information of the corresponding channel.

If the channel information is identified as described above, the broadcast receiving apparatus calculates a channel setting value regarding each of the channels. The channel setting value is a physical parameter value used to set each of the channels scanned by the tuner, and may include at least one from among frequency offset, AGC information, and inversion information. However, this should not be considered as limiting and the channel setting value may further include another physical parameter value to tune to each of the channels. If the tuner parameter information including the channel information of each of the channels scanned by the tuner and the channel setting value to tune to a channel corresponding to channel information is generated as described above, the broadcast receiving apparatus performs an operation to store the tuner parameter information of each of the channels in the storage unit.

Accordingly, if a channel change request is input by the user, the broadcast receiving apparatus obtains tuner parameter information of a channel corresponding to the input channel change request from among the tuner parameter information of the channels stored in the storage unit, and tunes to a corresponding channel using the obtained tuner parameter information. Since the broadcast receiving apparatus according to an exemplary embodiment generates and performs an operation to store the tuner parameter information of each of the channels in advance as described above, if a channel change request is input by the user, the broadcast receiving apparatus is not required to perform a series of loop operations to calculate a channel setting value to tune to a channel corresponding to the input channel change request. Therefore, the broadcast receiving apparatus can tune to a channel more swiftly in comparison with a related-art broadcast receiving apparatus.

If the tuner parameter information of each of the channels is generated, the broadcast receiving apparatus generates demodulation parameter information including a demodulation setting value to demodulate an intermediate frequency signal received through the scanned channels (S340). The demodulation setting value is a physical parameter value to demodulate an intermediate frequency signal of each of the channels tuned by the tuner, and may include at least one from among modulation information, FEC type information, AGC information, and inversion information. However, this should not be considered as limiting and the demodulation setting value may further include another physical parameter value to demodulate an intermediate frequency signal received through a tuned channel. If the demodulation parameter information including the demodulation setting value to demodulate the intermediate frequency signal of each of the channels is generated, the broadcast receiving apparatus performs an operation to store the demodulation parameter information of each of the channels in the storage unit.

Accordingly, if a channel change request is input by the user, the broadcast receiving apparatus obtains demodulation parameter information of a channel corresponding to the input channel change request from the storage unit. Subsequently, if the channel corresponding to the channel change request is tuned and an intermediate frequency signal is received from the corresponding channel, the broadcast receiving apparatus demodulates the intermediate frequency signal using a demodulation setting value included in the obtained demodulation parameter information.

Since the broadcast receiving apparatus according to an exemplary embodiment generates and performs an operation to store the demodulation parameter information of each of the channels in advance as described above, if a channel corresponding to a channel change request input by the user is tuned, the broadcast receiving apparatus is not required to perform a loop operation to calculate a demodulation setting value to demodulate an intermediate frequency signal of the tuned channel. Therefore, a time required to demodulate an intermediate frequency signal of a channel corresponding to a channel change request input by the user can be saved in comparison with a related-art broadcast receiving apparatus.

The broadcast receiving apparatus obtains PSI from signals received through the scanned channels and performs an operation to store the PSI (S350). The PSI includes broadcast program information and A/V PID information provided by each of the channels scanned by the tuner. The broadcast program information may include information on a start time and a finish time of a broadcast program. If the PSI of each of the channels is obtained as described above, the broadcast receiving apparatus performs an operation to store the PSI of each of the channels in the storage unit. Accordingly if a channel change request is input by the user, the broadcast receiving apparatus obtains PSI of a channel corresponding to the input channel change request from the storage unit. Subsequently, if the channel corresponding to the channel change request is tuned and a signal of the channel is demodulated, the broadcast receiving apparatus decodes the demodulated signal using A/V PID information corresponding to a current broadcast program by referring to broadcast program information included in the obtained PSI.

Since the broadcast receiving apparatus according to an exemplary embodiment decodes the demodulated signal using the A/V PID information included in the PSI of each of the channels stored in the storage unit as described above, a time required to obtain PID information from a signal of a tuned channel and decode the signal every time a channel is changed can be saved. Therefore, the broadcast receiving apparatus can decode the signal more swiftly in comparison with a related-art broadcast receiving apparatus.

In the above exemplary embodiment, the broadcast receiving apparatus generates the demodulation parameter information to demodulate the intermediate frequency signal of each channel and obtains the PSI to decode the demodulated signal, after generating the tuner parameter information on the scanned channels. However, the present disclosure is not limited to generating and obtaining the above information in phases. If the channels are scanned in operation S320, the broadcast receiving apparatus may generate the tuner parameter information of each of the channels and the demodulation parameter information and obtain the PSI, simultaneously.

According to an exemplary embodiment, the broadcast receiving apparatus may update the A/V PID information included in the PSI which is generated for every channel in operation S350. Hereinafter, a method for updating A/V PID information included in PSI of each channel in the broadcast receiving apparatus will be explained.

FIG. 4 is a flowchart illustrating a method for updating A/V PID information included in PSI in a broadcast receiving apparatus according to an exemplary embodiment.

As shown in FIG. 4, the broadcast receiving apparatus checks whether a second tuner exists or no (S410). That is, the broadcast receiving apparatus performs the following operation according to whether a single tuner is provided or not. As a result of the checking, if a single tuner (hereinafter, referred to as a first tuner) is provided, the broadcast receiving apparatus checks whether the first tuner tunes to a channel or not (S420). As a result of the checking, if the first tuner tunes to a channel, it is checked whether the first tuner tunes the channel periodically or not. On the other hand, if the first tuner does not tune to a channel and is determined to be an idle tuner as a result of the checking, the broadcast receiving apparatus determines whether A/V PID information is changed or not by referring to pre-stored EPG information of each channel (S430).

Specifically, the broadcast receiving apparatus checks whether there is changed A/V PID information from among the A/V PID information of each broadcast program of each of the channels stored in the storage unit by referring to the A/V PID information of each broadcast program of each of the channels included in the EPG information of each of the channels. As a result of the checking, if there is no A/V PID information changed, the broadcast receiving apparatus checks whether the first tuner is in an idle state or not and whether the A/V PID information is changed or not periodically as in operations S420 and S430. As a result of the checking, if at least one piece of A/V PID information is changed from among the A/V PID information of each broadcast program of each of the channels stored in the storage unit, the broadcast receiving apparatus updates the corresponding A/V PID information with the A/V PID information included in the EPG information.

If it is determined that the second timer exists in operation S410, the broadcast receiving apparatus scans channels and receives signals regarding the channels, while the first tuner tunes to a channel corresponding to a channel change request input by the user (S450). If the signals of the scanned channels are received, the broadcast receiving apparatus obtains SI from the signals (S460). The SI includes PSI of each of the channels. If such SI is obtained, the broadcast receiving apparatus checks whether the A/V PID information included in the PSI of each of the channels stored in the storage unit is changed or not in operation S430.

Specifically, if the SI including the PSI of each of the channels is obtained, the broadcast receiving apparatus checks whether there is changed A/V PID information from among the A/V PID information included in the PSI of each of the channels stored in the storage unit by referring to the PSI of each the channels included in the obtained SI. As a result of the checking, if there is changed A/V PID information from among the A/V PID information included in the PSI of each of the channels stored in the storage unit, the broadcast receiving apparatus updates the A/V PID information stored in the storage unit with the A/V PID information of the PSI of a corresponding channel included in the SI in operation S440.

Since the broadcast receiving apparatus according to an exemplary embodiment updates the A/V PID information of each broadcast program of each of the channels stored in the storage unit by referring to the EPG information of each of the channels or using the plurality of tuners as described above, the number of times that the A/V PID information of each channel is changed can be minimized.

Above, some exemplary embodiments have been described.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A broadcast receiving apparatus comprising:
a tuner unit which performs channel scanning;
a tuner parameter generation unit which generates tuner parameter information which comprises channel information of channels scanned by the tuner unit and a channel setting value to tune to a channel corresponding to the channel information;
a storage unit which stores the tuner parameter information;
an input unit which receives input of a channel change request;
a control unit which, if the channel change request is input, controls the tuner unit to tune to a requested channel using the tuner parameter information stored in the storage unit;
an information processing unit which obtains program specific information (PSI) from signals received through the channels scanned by the tuner unit and stores the PSI in the storage unit; and
an electronic program guide (EPG) storage unit which stores EPG information on the scanned channels,
wherein, if the tuner unit is in an idle state, the information processing unit determines whether the audio/video PID information is changed or not by referring to the EPG information stored in the EPG storage unit, and updates the audio/video PID information included in the PSI.

2. The broadcast receiving apparatus as claimed in claim 1, wherein, if an auto channel scan command is input through the input unit, the control unit controls the tuner unit to perform the channel scanning.

3. The broadcast receiving apparatus as claimed in claim 2, wherein the tuner parameter generation unit identifies channel information of each channel scanned by the tuner unit and calculates a channel setting value regarding the identified channel information, and generates the tuner parameter information based on the channel information and the channel setting value.

4. The broadcast receiving apparatus as claimed in claim 3, wherein the channel information comprises at least one from among a channel frequency and a channel number,
wherein the channel setting value comprises at least one from among frequency offset, auto gain control (AGC) information, and inversion information.

5. The broadcast receiving apparatus as claimed in claim 2, further comprising a demodulation parameter generation unit which generates demodulation parameter information comprising a demodulation setting value to demodulate an intermediate frequency signal received though the channels scanned by the tuner unit, and performs an operation to store the demodulation parameter information in the storage unit.

6. The broadcast receiving apparatus as claimed in claim 5, further comprising a demodulation unit which, if a channel corresponding to the channel change request is tuned, demodulates an intermediate frequency signal received through the tuned channel using the demodulation parameter information stored in the storage unit,
wherein the demodulation setting value comprises at least one from among frequency modulation information, forward error correction (FEC) type information, AGC information, and inversion information.

7. The broadcast receiving apparatus as claimed in claim 2, wherein the tuner unit comprises:
a first tuner unit which tunes to a channel corresponding to the channel change request; and
a second tuner which performs the channel scanning, while the first tuner tunes to the channel.

8. The broadcast receiving apparatus as claimed in claim 7, wherein the information processing unit obtains service information (SI) from signals received from channels scanned by the second tuner unit, and updates the audio/video PID information included in the PSI of the channels stored in the storage unit.

9. The broadcast receiving apparatus as claimed in claim 1, wherein the PSI comprises at least one from among program time information and audio/video packet identifier (PID) information of said each broadcast program provided by each of the scanned channels.

10. The broadcast receiving apparatus as claimed in claim 9, further comprising a decoding unit which, if a channel corresponding to the channel change request is tuned, decodes the demodulated intermediate frequency signal using the PSI stored in the storage unit.

11. A method for receiving a broadcast of a broadcast receiving apparatus, the method comprising:
performing channel scanning;
generating and storing tuner parameter information which comprises channel information of the scanned channels and a channel setting value to tune to a channel corresponding to the channel information;
if a channel change request is input, tuning to a requested channel using the stored tuner parameter information;
obtaining program specific information (PSI) from signals received through the scanned channels and storing the PSI; and
if the channel scanning is not performed, determining whether the audio/video PID information is changed or not by referring to EPG information pre-stored for the scanned channels, and updating the audio/video PID information included in the PSI.

12. The method as claimed in claim 11, wherein the performing the channel scanning comprises, if an auto channel scan command is input, performing the channel scanning.

13. The method as claimed in claim 12, wherein the generating and storing the tuner parameter information comprises identifying channel information of each of the scanned channels, calculating a channel setting value regarding the identified channel information, and generating the tuner parameter information based on the channel information and the channel setting value.

14. The method as claimed in claim 13, wherein the channel information comprises at least one from among a channel frequency and a channel number,
wherein the channel setting value comprises at least one from among frequency offset, auto gain control (AGC) information, and inversion information.

15. The method as claimed in claim 12, further comprising generating and storing demodulation parameter information comprising a demodulation setting value to demodulate an intermediate frequency signal received through the scanned channels.

16. The method as claimed in claim 15, further comprising, if a channel corresponding to the channel change request is tuned, demodulating an intermediate frequency signal received through the tuned channel using the stored demodulation parameter information,
wherein the demodulation setting value comprises at least one from among frequency modulation information, forward error correction (FEC) type information, auto gain control (AGC) information, and inversion information.

17. The method as claimed in claim 11,
wherein the PSI comprises at least one from among program time information and audio/video PID information of said each broadcast program provided by each of the scanned channels.

18. The method as claimed in claim 17, further comprising, if a channel corresponding to the channel change request is tuned, decoding the demodulated intermediate frequency signal using the stored PSI.

19. The method as claimed in claim 11, wherein the broadcast receiving apparatus comprises a plurality of tuners,
wherein a first tuner of the plurality of tuners tunes to one channel and receives a broadcast signal,
wherein a second tuner of the plurality of tuners performs the channel scanning, while the first tuner tunes to the one channel.

20. The method as claimed in claim 19, further comprising:
obtaining service information (SI) from signals received through channels scanned by the second tuner; and
determining whether the audio/video PID information included in the stored PSI is changed or not by referring to the SI and updating the audio/video PID information included in the PSI.

21. A broadcast receiving apparatus comprising:
one or more tuner units which perform channel scanning;
a tuner parameter generation unit which generates tuner parameter information;
a storage unit which stores the tuner parameter information;
a control unit which controls the one or more tuner units to tune to a channel using the tuner parameter information stored in the storage unit,
an information processing unit which obtains program specific information (PSI) from signals received through the channels scanned by the tuner unit and stores the PSI in the storage unit; and
an electronic program guide (EPG) storage unit which stores EPG information on the scanned channels,
wherein, if the tuner unit is in an idle state, the information processing unit determines whether the audio/video PID information is changed or not by referring to the EPG information stored in the EPG storage unit, and updates the audio/video PID information included in the PSI.

22. A method for receiving a broadcast of a broadcast receiving apparatus, the method comprising:
performing channel scanning;
generating and storing tuner parameter information which comprises channel information of the scanned channels and a channel setting value to tune to a channel corresponding to the channel information
tuning to a requested channel using the stored tuner parameter information
obtaining program specific information (PSI) from signals received through the scanned channels and storing the PSI; and
if the channel scanning is not performed, determining whether the audio/video PID information is changed or not by referring to EPG information pre-stored for the scanned channels, and updating the audio/video PID information included in the PSI.

* * * * *